(12) United States Patent
Ayaki

(10) Patent No.: US 7,062,158 B1
(45) Date of Patent: Jun. 13, 2006

(54) DATA RECORDING/REPRODUCING APPARATUS AND PROGRAM RECORDED MEDIUM

(75) Inventor: Yasushi Ayaki, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 317 days.

(21) Appl. No.: 09/869,420

(22) PCT Filed: Oct. 25, 2000

(86) PCT No.: PCT/JP00/07448

§ 371 (c)(1),
(2), (4) Date: Jun. 27, 2001

(87) PCT Pub. No.: WO01/31916

PCT Pub. Date: May 3, 2001

(30) Foreign Application Priority Data

Oct. 27, 1999 (JP) ................................. 11-305974

(51) Int. Cl.
H04N 5/781 (2006.01)
(52) U.S. Cl. ..................... 386/125; 386/47; 360/71
(58) Field of Classification Search ................ 386/113, 386/124, 125; 360/57, 71; 711/100; 348/552
See application file for complete search history.

(56) References Cited

U.S. PATENT DOCUMENTS

| 4,893,193 | A | | 1/1990 | Suzuki et al. | |
|---|---|---|---|---|---|
| 5,590,306 | A | * | 12/1996 | Watanabe et al. | 711/115 |
| 5,884,042 | A | * | 3/1999 | Winter et al. | 709/231 |
| 6,088,703 | A | * | 7/2000 | Kaneko | 386/46 |
| 6,233,607 | B1 | * | 5/2001 | Taylor et al. | 711/114 |
| 6,760,535 | B1 | * | 7/2004 | Orr | 386/46 |

FOREIGN PATENT DOCUMENTS

| JP | 64-64478 | | 3/1989 |
|---|---|---|---|
| JP | 06-250682 | A | 9/1994 |
| JP | 08-167275 | A | 6/1996 |
| JP | 09-034755 | A | 2/1997 |
| JP | 09-160814 | A | 6/1997 |
| JP | 09-213006 | A | 8/1997 |
| JP | 10-116087 | | 5/1998 |
| JP | 10-222404 | A | 8/1998 |
| JP | 10-241294 | A | 9/1998 |

(Continued)

OTHER PUBLICATIONS

English translation of Japanese search report for PCT/JP00/07448 dated Jan. 23, 2001.

(Continued)

*Primary Examiner*—James J. Groody
*Assistant Examiner*—James A. Fletcher
(74) *Attorney, Agent, or Firm*—RatnerPrestia

(57) ABSTRACT

Management in a disk according to conventional techniques is effective in only one recording area which is the entire disk, and therefore, it has been heretofore impossible to manage files by data type.

A data recording/reproducing apparatus comprises recording area setting means 50 of setting a plurality of logical recording areas in a recording medium, and file management means 60 which manages files with reference to free area management information, recording file management information and deletion file selecting criteria information, and data recording/reproducing apparatus is characterized in that when judging that a free area for writing the new data is insufficient, the file management means 60, referring to the deletion file selecting criteria information, deletes a portion or all of at least one file or does not execute an operation for writing the new data.

8 Claims, 21 Drawing Sheets

DATA CLASSIFICATION INFORMATION

| RECORDING AREA | DATA CLASSIFICATION | DETAILED DATA CLASSIFICATION |
|---|---|---|
| AID1 | AUDIO DATA | RECORDING DATE |
| AID2 | VIDEO DATA | NUMBER OF VIEWING |

DELETION FILE SELECTING CRITERIA INFORMATION

| RECORDING AREA | DELETION FILE SELECTING CRITERIA |
|---|---|
| AID1 | RECORDING TIME AND DETAILED DATA CLASSIFICATION |
| AID2 | NUMBER OF VIEWING AND DETAILED DATA CLASSIFICATION |

FOREIGN PATENT DOCUMENTS

| | | |
|---|---|---|
| JP | 10-260873 A | 9/1998 |
| JP | 10-276400 | 10/1998 |
| JP | 11-066694 A | 3/1999 |
| JP | 11-69298 | 3/1999 |
| JP | 11-112919 | 4/1999 |
| JP | 11-213634 A | 8/1999 |
| WO | WO 92/22983 | * 12/1992 |

OTHER PUBLICATIONS

European Search Report for EP 00 97 0051, dated Jul. 9, 2003.

* cited by examiner

Fig. 2

DATA CLASSIFICATION INFORMATION

| RECORDING AREA | DATA CLASSIFICATION |
|---|---|
| AID1 | VIDEO DATA |
| AID2 | AUDIO DATA |
| AID3 | STILL IMAGE DATA |

DELETION FILE SELECTING CRITERIA INFORMATION

| RECORDING AREA | DELETION FILE SELECTING CRITERIA |
|---|---|
| AID1 | NUMBER OF VIEWING AND RECORDING TIME |
| AID2 | RECORDING TIME |
| AID3 | PROHIBITION |

Fig. 3

FREE AREA MANAGEMENT INFORMATION

| RECORDING AREA | RECORDING CAPACITY | RECORDED CAPACITY | FREE CAPACITY |
|---|---|---|---|
| AID1 | 80GB | 0GB | 80GB |
| AID2 | 10GB | 0GB | 10GB |
| AID3 | 10GB | 0GB | 10GB |

Fig. 4

FREE AREA MANAGEMENT INFORMATION

| RECORDING AREA | RECORDING CAPACITY | RECORDED CAPACITY | FREE CAPACITY |
|---|---|---|---|
| AID1 | 80GB | 0GB | 80GB |
| AID2 | 10GB | 0GB | 10GB |
| AID3 | 10GB | 1MB | 10GB |

RECORDING FILE MANAGEMENT INFORMATION

RECORDING AREA = AID3 (STILL IMAGE DATA)

| FILE | RECORDING AREA INFORMATION | RECORDING START TIME | FILE SIZE | NUMBER OF VIEWING |
|---|---|---|---|---|
| FID1 | L1 | 2000/01/02 17:00 | 1MB | 0 |

Fig. 6

RECORDING FILE MANAGEMENT INFORMATION

RECORDING AREA = AID1 (VIDEO DATA)

| FILE | RECORDING AREA INFORMATION | RECORDING START TIME | FILE SIZE | NUMBER OF VIEWING |
|---|---|---|---|---|
| FID5 | L5 | 2000/10/02 17:00 | 10GB | 0 |
| FID8 | L8 | 2001/05/03 13:00 | 20GB | 1 ← DELETE CANDIDATE |
| FID9 | L9 | 2002/06/03 21:00 | 30GB | 0 |

RECORDING AREA = AID2 (AUDIO DATA)

| FILE | RECORDING AREA INFORMATION | RECORDING START TIME | FILE SIZE | NUMBER OF VIEWING |
|---|---|---|---|---|
| FID4 | L4 | 2000/10/02 12:00 | 5MB | 1 |
| FID6 | L6 | 2000/10/03 12:00 | 4MB | 1 |
| FID7 | L7 | 2000/10/06 12:00 | 6MB | 0 |
| ---- | ---- | ---- | ---- | ---- |
| FID999 | L999 | 2003/11/06 12:00 | 6MB | 0 |

RECORDING AREA = AID3 (STILL IMAGE DATA)

| FILE | RECORDING AREA INFORMATION | RECORDING START TIME | FILE SIZE | NUMBER OF VIEWING |
|---|---|---|---|---|
| FID1 | L1 | 2000/01/02 17:00 | 1MB | 3 |
| FID2 | L2 | 2000/05/03 13:00 | 0.5MB | 2 |
| FID3 | L3 | 2000/06/03 21:00 | 1MB | 0 |
| ---- | ---- | ---- | ---- | ---- |
| FID998 | L998 | 2003/10/06 12:00 | 6MB | 0 |

Fig. 7

FREE AREA MANAGEMENT INFORMATION

| RECORDING AREA | RECORDING CAPACITY | RECORDED CAPACITY | FREE CAPACITY |
|---|---|---|---|
| AID1 | 80GB | 70GB | 10GB |
| AID2 | 10GB | 10GB | 0GB |
| AID3 | 10GB | 5GB | 5GB |

Fig. 8

RECORDING FILE MANAGEMENT INFORMATION

| RECORDING AREA = AID1 (VIDEO DATA) | | | |
|---|---|---|---|
| FILE | RECORDING AREA INFORMATION | RECORDING START TIME | FILE SIZE | NUMBER OF VIEWING |
| FID5 | L5 | 2000/10/02 17:00 | 10GB | 0 |
| FID9 | L9 | 2002/06/03 21:00 | 30GB | 0 |
| FID1000 | L1000 | 2003/11/07 12:00 | 30GB | 0 |

| RECORDING AREA = AID2 (AUDIO DATA) | | | |
|---|---|---|---|
| FILE | RECORDING AREA INFORMATION | RECORDING START TIME | FILE SIZE | NUMBER OF VIEWING |
| FID4 | L4 | 2000/10/02 12:00 | 5MB | 1 ← DELETE CANDIDATE |
| FID6 | L6 | 2000/10/03 12:00 | 4MB | 1 ← SECOND DELETE CANDIDATE |
| FID7 | L7 | 2000/10/06 12:00 | 6MB | 0 |
| --- | --- | --- | --- | --- |
| FID999 | L999 | 2003/11/06 12:00 | 6MB | 0 |

| RECORDING AREA = AID3 (STILL IMAGE DATA) | | | |
|---|---|---|---|
| FILE | RECORDING AREA INFORMATION | RECORDING START TIME | FILE SIZE | NUMBER OF VIEWING |
| FID1 | L1 | 2000/01/02 17:00 | 1MB | 3 |
| FID2 | L2 | 2000/05/03 13:00 | 0.5MB | 2 |
| FID3 | L3 | 2000/06/03 21:00 | 1MB | 0 |
| --- | --- | --- | --- | --- |
| FID998 | L998 | 2003/10/06 12:00 | 6MB | 0 |

Fig. 9

FREE AREA MANAGEMENT INFORMATION

| RECORDING AREA | RECORDING CAPACITY | RECORDED CAPACITY | FREE CAPACITY |
|---|---|---|---|
| AID1 | 80GB | 70GB | 10GB |
| AID2 | 10GB | 10GB | 0GB |
| AID3 | 10GB | 5GB | 5GB |

Fig. 10

RECORDING FILE MANAGEMENT INFORMATION

RECORDING AREA = AID1 (VIDEO DATA)

| FILE | RECORDING AREA INFORMATION | RECORDING START TIME | FILE SIZE | NUMBER OF VIEWING |
|---|---|---|---|---|
| FID5 | L5 | 2000/10/02 17:00 | 10GB | 0 |
| FID9 | L9 | 2002/06/03 21:00 | 30GB | 0 |
| FID1000 | L1000 | 2003/11/07 12:00 | 30GB | 0 |

RECORDING AREA = AID2 (AUDIO DATA)

| FILE | RECORDING AREA INFORMATION | RECORDING START TIME | FILE SIZE | NUMBER OF VIEWING |
|---|---|---|---|---|
| FID7 | L7 | 2000/10/06 12:00 | 6MB | 0 |
| --- | --- | --- | --- | --- |
| FID999 | L999 | 2003/11/06 12:00 | 6MB | 0 |
| FID1001 | L1001 | 2003/11/07 13:00 | 9MB | 0 |

RECORDING AREA = AID3 (STILL IMAGE DATA)

| FILE | RECORDING AREA INFORMATION | RECORDING START TIME | FILE SIZE | NUMBER OF VIEWING |
|---|---|---|---|---|
| FID1 | L1 | 2000/01/02 17:00 | 1MB | 3 |
| FID2 | L2 | 2000/05/03 13:00 | 0.5MB | 2 |
| FID3 | L3 | 2000/06/03 21:00 | 1MB | 0 |
| --- | --- | --- | --- | --- |
| FID998 | L998 | 2003/10/06 12:00 | 6MB | 0 |

Fig. 11

FREE AREA MANAGEMENT INFORMATION

| RECORDING AREA | RECORDING CAPACITY | RECORDED CAPACITY | FREE CAPACITY |
|---|---|---|---|
| AID1 | 80GB | 60GB | 20GB |
| AID2 | 10GB | 10GB | 0GB |
| AID3 | 10GB | 5GB | 5GB |

Fig. 12

RECORDING FILE MANAGEMENT INFORMATION

RECORDING AREA = AID1 (VIDEO DATA)

| FILE | RECORDING AREA INFORMATION | RECORDING START TIME | FILE SIZE | NUMBER OF VIEWING |
|---|---|---|---|---|
| FID1000 | L1000 | 2003/11/07 12:00 | 30GB | 0 |
| FID1002 | L1002 | 2003/11/07 14:00 | 30GB | 0 |

RECORDING AREA = AID2 (AUDIO DATA)

| FILE | RECORDING AREA INFORMATION | RECORDING START TIME | FILE SIZE | NUMBER OF VIEWING |
|---|---|---|---|---|
| FID7 | L7 | 2000/10/06 12:00 | 6MB | 0 |
| ... | ... | ... | ... | ... |
| FID999 | L999 | 2003/11/06 12:00 | 6MB | 0 |
| FID1001 | L1001 | 2003/11/07 13:00 | 9MB | 0 |

RECORDING AREA = AID3 (STILL IMAGE DATA)

| FILE | RECORDING AREA INFORMATION | RECORDING START TIME | FILE SIZE | NUMBER OF VIEWING |
|---|---|---|---|---|
| FID1 | L1 | 2000/01/02 17:00 | 1MB | 3 |
| FID2 | L2 | 2000/05/03 13:00 | 0.5MB | 2 |
| FID3 | L3 | 2000/06/03 21:00 | 1MB | 0 |
| ... | ... | ... | ... | ... |
| FID998 | L998 | 2003/10/06 12:00 | 6MB | 0 |

Fig. 14

DATA CLASSIFICATION INFORMATION

| RECORDING AREA | DATA CLASSIFICATION | DETAILED DATA CLASSIFICATION |
|---|---|---|
| AID1 | AUDIO DATA | RECORDING DATE |
| AID2 | VIDEO DATA | NUMBER OF VIEWING |

DELETION FILE SELECTING CRITERIA INFORMATION

| RECORDING AREA | DELETION FILE SELECTING CRITERIA | DETAILED DATA CLASSIFICATION |
|---|---|---|
| AID1 | RECORDING TIME AND DETAILED DATA CLASSIFICATION | |
| AID2 | NUMBER OF VIEWING AND DETAILED DATA CLASSIFICATION | |

Fig. 15

FREE AREA MANAGEMENT INFORMATION

| RECORDING AREA | RECORDING CAPACITY | RECORDED CAPACITY | FREE CAPACITY |
|---|---|---|---|
| AID1 | 20GB | 20GB | 0GB |
| AID2 | 80GB | 78GB | 2GB |

RECORDING FILE MANAGEMENT INFORMATION

RECORDING AREA = AID 1 (AUDIO DATA)

| FILE | RECORDING AREA INFORMATION | RECORDING START TIME | FILE SIZE | NUMBER OF VIEWING | GROUP |
|---|---|---|---|---|---|
| FID1 | L1 | 2000/01/02 12:00 | 4MB | 0 | GID1 |
| FID2 | L2 | 2000/01/02 12:04 | 5MB | 0 | GID1 |
| FID3 | L3 | 2000/01/02 12:09 | 4MB | 1 | GID1 |
| FID4 | L4 | 2000/03/20 07:00 | 2MB | 0 | GID2 |
| FID5 | L5 | 2000/03/20 07:02 | 3MB | 3 | GID2 |
| ... | ... | ... | ... | ... | ... |
| FID999 | L999 | 2003/11/06 12:00 | 6MB | 0 | GID99 |

(FID1, FID2, FID3 marked as DELETE CANDIDATE)

RECORDING AREA = AID1 (VIDEO DATA)

| FILE | RECORDING AREA INFORMATION | RECORDING START TIME | FILE SIZE | NUMBER OF VIEWING | GROUP |
|---|---|---|---|---|---|
| FID6 | L6 | 2000/03/20 07:00 | 2GB | 2 | GID3 |
| FID7 | L7 | 2000/03/27 07:00 | 2GB | 2 | GID3 |
| ... | ... | ... | ... | ... | ... |
| FID998 | L998 | 2003/10/06 12:00 | 6GB | 1 | GID100 |

Fig. 16

FREE AREA MANAGEMENT INFORMATION

| RECORDING AREA | RECORDING CAPACITY | RECORDED CAPACITY | FREE CAPACITY |
|---|---|---|---|
| AID1 | 20GB | 20GB | 0GB |
| AID2 | 80GB | 78GB | 2GB |

RECORDING FILE MANAGEMENT INFORMATION

RECORDING AREA = AID 1 (AUDIO DATA)

| FILE | RECORDING AREA INFORMATION | RECORDING START TIME | FILE SIZE | NUMBER OF VIEWING | GROUP |
|---|---|---|---|---|---|
| FID4 | L4 | 2000/03/20 07:00 | 2MB | 0 | GID2 |
| FID5 | L5 | 2000/03/20 07:02 | 3MB | 3 | GID2 |
| ... | ... | ... | ... | ... | ... |
| FID999 | L999 | 2003/11/06 12:00 | 6MB | 0 | GID99 |
| FID1000 | L1000 | 2003/11/06 13:00 | 13MB | 0 | GID99 |

RECORDING AREA = AID 2 (VIDEO DATA)

| FILE | RECORDING AREA INFORMATION | RECORDING START TIME | FILE SIZE | NUMBER OF VIEWING | GROUP |
|---|---|---|---|---|---|
| FID6 | L6 | 2000/03/20 07:00 | 2GB | 2 | GID3 ← DELETE CANDIDATE |
| FID7 | L7 | 2000/03/27 07:00 | 2GB | 2 | GID3 ← DELETE CANDIDATE |
| ... | ... | ... | ... | ... | ... |
| FID998 | L998 | 2003/10/06 12:00 | 6GB | 1 | GID100 |

Fig. 17

FREE AREA MANAGEMENT INFORMATION

| RECORDING AREA | RECORDING CAPACITY | RECORDED CAPACITY | FREE CAPACITY |
|---|---|---|---|
| AID1 | 20GB | 20GB | 0GB |
| AID2 | 80GB | 79GB | 1GB |

RECORDING FILE MANAGEMENT INFORMATION

RECORDING AREA = AID 1 (AUDIO DATA)

| FILE | RECORDING AREA INFORMATION | RECORDING START TIME | FILE SIZE | NUMBER OF VIEWING | GROUP |
|---|---|---|---|---|---|
| FID4 | L4 | 2000/03/20 07:00 | 2MB | 0 | GID2 |
| FID5 | L5 | 2000/03/20 07:02 | 3MB | 3 | GID2 |
| ... | ... | ... | ... | ... | ... |
| FID999 | L999 | 2003/11/06 12:00 | 6MB | 0 | GID99 |
| FID1000 | L1000 | 2003/11/06 13:00 | 13MB | 0 | GID99 |

RECORDING AREA = AID 2 (VIDEO DATA)

| FILE | RECORDING AREA INFORMATION | RECORDING START TIME | FILE SIZE | NUMBER OF VIEWING | GROUP |
|---|---|---|---|---|---|
| ... | ... | ... | ... | ... | ... |
| FID998 | L998 | 2003/10/06 12:00 | 6GB | 1 | GID100 |
| FID1001 | L1001 | 2003/11/06 14:00 | 5MB | 0 | GID4 |

Fig. 20

FREE AREA MANAGEMENT INFORMATION

| RECORDING CAPACITY | RECORDED CAPACITY | FREE CAPACITY |
|---|---|---|
| 100GB | 98GB | 2GB |

RECORDING FILE MANAGEMENT INFORMATION

| FILE | RECORDING AREA INFORMATION | RECORDING START TIME | FILE SIZE | NUMBER OF VIEWING |
|---|---|---|---|---|
| FID1 | L1 | 2000/01/02 12:00 | 4GB | 6 ← DELETE CANDIDATE |
| FID2 | L2 | 2000/01/02 12:04 | 5MB | 0 |
| FID3 | L3 | 2000/01/02 12:09 | 4MB | 1 |
| FID4 | L4 | 2000/03/20 07:00 | 8GB | 0 |
| FID5 | L5 | 2000/03/20 07:02 | 3MB | 3 |
| ... | ... | ... | ... | ... |
| FID999 | L999 | 2003/11/06 12:00 | 6GB | 0 |

Fig. 21

FREE AREA MANAGEMENT INFORMATION

| RECORDING CAPACITY | RECORDED CAPACITY | FREE CAPACITY |
|---|---|---|
| 100GB | 99GB | 1GB |

RECORDING FILE MANAGEMENT INFORMATION

| FILE | RECORDING AREA INFORMATION | RECORDING START TIME | FILE SIZE | NUMBER OF VIEWING |
|---|---|---|---|---|
| FID2 | L2 | 2000/01/02 12:04 | 5MB | 0 |
| FID3 | L3 | 2000/01/02 12:09 | 4MB | 1 |
| FID4 | L4 | 2000/03/20 07:00 | 8GB | 0 |
| FID5 | L5 | 2000/03/20 07:02 | 3MB | 3 |
| ... | ... | ... | ... | ... |
| FID999 | L999 | 2003/11/06 12:00 | 6GB | 0 |
| FID1000 | L1000 | 2000/11/06 12:30 | 5GB | 0 |

DATA RECORDING/REPRODUCING APPARATUS AND PROGRAM RECORDED MEDIUM

THIS APPLICATION IS A U.S. NATIONAL PHASE APPLICATION OF PCT INTERNATIONAL APPLICATION PCT/JP00/07448.

TECHNICAL FIELD OF THE INVENTION

The present invention relates to a data recording/reproducing apparatus.

BACKGROUND ART

First, a structure of a data recording/reproducing apparatus according to a conventional technique will be described with reference to FIG. 19. FIG. 19 is a structure diagram of a data recording/reproducing apparatus according to a conventional technique.

An interface circuit 10 is a portion which supplies digital AV signals, instructions and responses to and receives the digital AV signals, the instructions and the responses from digital AV equipment 80.

A system controller 20 is a device which presides over and controls each means which forms the data recording/reproducing apparatus, controlling so that a digital AV signal which is supplied through the interface circuit 10 or an encoder circuit 40 is recorded on a disk 31 and such that the digital AV signal recorded on the disk 31 is outputted through the interface circuit 10 or a decoder circuit 41. Meanwhile, the system controller 20 controls such that the digital AV signal which is recorded on the disk 31 is saved and deleted in the unit of files.

A buffer control circuit 21 is a circuit which outputs the digital AV signal, which is supplied through the interface circuit 10 or the encoder circuit 40, to recording/reproducing means 30 after temporarily storing the digital AV signal in a buffer RAM 22, and outputs the digital AV signal to the interface circuit 10 or the decoder circuit 41 after temporarily storing the digital AV signal supplied from the recording/reproducing means 30 in the buffer RAM 22, to thereby ensure continues recording or continuous reproduction of the AV signal.

The buffer RAM 22 is a device which has a function as a register to read out temporarily saved data in accordance with a necessity.

The recording/reproducing means 30 is means of recording the digital AV signal received from the buffer control circuit 21 on the disk 31, and reproducing the digital AV signal recorded on the disk 31 and outputting to the buffer control circuit 21.

The encoder circuit 40 is a circuit which encodes an inputted analog AV signal. The decoder circuit 41 is a circuit which decodes the digital AV signal outputted by the recording/reproducing means 30 and supplies the analog AV signal to a reproducing apparatus (not shown) to thereby reproduce images and sounds.

File management means 260 is means of referring to and updating free area management information, recording file management information, deletion file selecting criteria information and the like to thereby manage reproduction, saving, deletion, etc., of files, issuing an instruction to the system controller 20 so that an entered digital AV signal is recorded on the disk 31 in the unit of files and the digital AV signal recorded on the disk 31 is reproduced in the unit of files. Further, the file management means 260 issues an instruction to the system controller 20 so that the digital AV signal recorded on the disk 31 is deleted in the unit of files. The free area management information, the recording file management information, and the deletion file selecting criteria information will be described later.

Deletion file selecting criteria information setting means 261 is means which is for a user to set up the deletion file selecting criteria information which is for selecting a file which is to be deleted as new data are written (hereinafter referred to as "delete candidate"). A deletion file selecting criteria herein described in relation to the conventional technique is the number of viewing and the recording time.

The digital AV equipment 80 is equipment which supplies the digital AV signal, an instruction and a response to and receives the digital AV signal, the command and the response from the interface circuit 10 of the data recording/reproducing apparatus.

Operations of the data recording/reproducing apparatus according to the conventional technique having such a structure will be described with reference to FIG. 19.

In response to a user's instruction, the deletion file selecting criteria information setting means 261 provides the file management means 260 with the deletion file selecting criteria information which is for selecting a file which is to be deleted as new data are written. As herein described, the deletion file selecting criteria information setting means 261 notifies the file management means 260 of such setup which requires to first delete a file which bears the number of viewing of 1 or more and the earliest recording start time.

Next, a description will be given on an operation of the data recording/reproducing apparatus according to the conventional technique as the digital AV equipment 80 receives data as a signal. The data referred to here are data to be saved on the disk 31 as a file FID1 whose size is 4 GB.

The digital AV equipment 80 outputs to the data recording/reproducing apparatus this data to be recorded and the volume of this data to be recorded, as a signal. The system controller 20 analyzes the signal which is supplied through the digital AV equipment 80, and notifies the file management means 260 that this data are data which are to be saved as a 4 GB file.

The file management means 260 determines to save the data supplied through the digital AV equipment 80 as a signal on the disk 31 as the file FID1, and instructs the system controller 20 to execute this.

Receiving the instruction which was outputted as a signal from the file management means 260, the system controller 20 writes the data supplied through the digital AV equipment 80 on the disk 31 as the file FID1, and notifies the file management means 260 of this.

The data recording/reproducing apparatus according to the conventional technique writes data in a manner described above. An operation for writing is similar to the writing operation already described earlier, when a free capacity in the disk 31 is larger than the size of data which are to be newly written.

The data recording/reproducing apparatus according to the conventional technique keeps writing data on the disk 31 which is loaded in the recording/reproducing means 30 in this manner, so that the files FID1, FID2, FID3, . . . FID999 are saved on the disk 31. The recording/reproducing means 30 in some cases outputs data saved as a file on the disk 31 through the decoder circuit 41, in response to an instruction from a user (so that the user views the data saved as a file on the disk 31). Further, as described in detail later, the number of outputting is described as the number of viewing in the recording file management information.

The file management means 260 holds the free area management information and the recording file management information. The free area management information contains a recording capacity, a recorded capacity and a free capacity, whereas the recording file management information contains recording area information, the recording start time, a file size and the number of viewing, both of which are as shown in FIG. 20. FIG. 20 shows charts of the free area management information and the recording file management information updated according to the conventional technique.

Next, a description will be given on operations of the data recording/reproducing apparatus according to the conventional technique as the digital AV equipment 80 receives new data as a signal. The new data are data to be saved on the disk 31 as a file FID1000 whose size is 5 GB.

The digital AV equipment 80 outputs to the data recording/reproducing apparatus this new data which are to be recorded and the volume of this data to be recorded, as a signal. The system controller 20 analyzes the signal supplied from the digital AV equipment 80, and notifies the file management means 260 that this data are data which are to be saved as a 5 GB file.

The file management means 260 refers to the free area management information which is shown in FIG. 20, and recognizes that a free capacity in the disk 31 is 2 GB which is smaller than the size of the file (5 GB) which is to be newly saved.

The file management means 260 recognizes that the file FID1 which bears the number of viewing of 1 or larger and the oldest recording time is a delete candidate, determines to delete the file FID1 and ensure a free area of 6 GB in total so that the data received as the signal through the digital AV equipment 80 will be written on the disk 31 as the file FID1000, and issues an instruction to delete FID1 to the system controller 20.

Receiving the instruction outputted as the signal from the file management means 260, the system controller 20 deletes FID1 and writes the data newly supplied through the digital AV equipment 80 on the disk 31 as the file FID1000. The system controller 20 notifies the file management means 260 of this.

Upon receipt of the notification from the system controller 20, the file management means 260 updates the free area management information and the recording file management information which are shown in FIG. 20 respectively into such free area management information and recording file management information as those shown in FIG. 21. FIG. 21 shows charts of the free area management information and the recording file management information updated in the conventional technique.

By the way, the recent years have seen development of a disk device mounting an HDD (Hard Disk Drive). Recording capacities and data transfer speeds of data recording/reproducing apparatuses are accordingly rapidly improving. This has led to easy realization of recording and reproduction of a plurality types of data, such as video data, audio data and still image data, using only one data recording/reproducing apparatus.

However, since management in a disk according to conventional techniques is effective in only one recording area, it has been heretofore impossible to manage files by data type.

DISCLOSURE OF THE INVENTION

Considering such problems, the present invention aims at providing a data recording/reproducing apparatus which is characterized in performing management, such as saving and deletion of files, appropriately by data type.

One aspect of the present invention is a data recording/reproducing apparatus, comprising:
  recording area setting means of setting a plurality of logical recording areas in a recording medium which is for recording and reproducing data; and
  file management means which refers to free area management information, which is for managing a free area capacity for each one of said recording areas, recording file management information, which is for managing a file to be recorded for each one of said recording areas, and deletion file selecting criteria information, which is for selecting a file to be deleted for each one of said recording areas, and executes management of said files,
  being characterized in that for writing of new data in a predetermined recording area, when said file management means judges that a free area for writing said new data is insufficient with reference to said free area management information, said file management means, referring to said deletion file selecting criteria information, deletes a portion or all of at least one file which is recorded in said predetermined recording area or does not execute an operation for writing said new data.

Another aspect of the present invention is a data recording/reproducing apparatus in accordance with said first invention, characterized in that when not executing writing of said new data, said file management means notifies to outside that writing of said new data is not executed, and accepts an instruction in response to the notification from outside.

Still another aspect of the present invention is a data recording/reproducing apparatus in accordance with said first invention, characterized in comprising deletion file selecting criteria information setting means which is for a user to set up said deletion file selecting criteria information for each one of said recording areas.

Yet another aspect of the present invention (corresponding to claim 4) is a data recording/reproducing apparatus in accordance with said first invention, characterized in that said files are grouped in accordance with a predetermined criteria, said file management means, when deleting a portion or all of at least one file which is recorded in said predetermined recording area, deletes the file which is to be deleted as well as other files which belong to the same group as the file which is to be deleted.

Still yet another aspect of the present invention is a data recording/reproducing apparatus in accordance with any one of said first through fourth inventions, characterized in that a classification of said data which are to be written is different for each one of said recording areas, and said data recording/reproducing apparatus comprises data classification information setting means which is for a user to set up, for each one of said recording areas, data classification information which is for setting up a classification of data which are to be written.

A further aspect of the present invention is a medium which is characterized in that it can be handled with a computer and characterized in carrying a program and/or data which is for executing with a computer all or some functions of all or some means of a data recording/reproducing apparatus in accordance with any one of said first through fifth claims.

BRIEF DESCRIPTION OF THE DRAWINGS

FIG. 2 shows charts of data classification information and deletion file selecting criteria information described in relation to the first preferred embodiment of the present invention;

FIG. 3 shows a chart of free area management information described in relation to the first preferred embodiment of the present invention;

FIG. 4 shows charts of free area management information and recording file management information described in relation to the first preferred embodiment of the present invention;

FIG. 6 shows charts of recording file management information described in relation to the first preferred embodiment of the present invention;

FIG. 7 shows a chart of free area management information described in relation to the first preferred embodiment of the present invention;

FIG. 8 shows charts of recording file management information described in relation to the first preferred embodiment of the present invention;

FIG. 9 shows a chart of free area management information described in relation to the first preferred embodiment of the present invention;

FIG. 10 shows charts of recording file management information described in relation to the first preferred embodiment of the present invention;

FIG. 11 shows a chart of free area management information described in relation to the first preferred embodiment of the present invention;

FIG. 12 shows charts of recording file management information described in relation to the first preferred embodiment of the present invention;

FIG. 14 shows charts of data classification information and deletion file selecting criteria information described in relation to the second preferred embodiment of the present invention;

FIG. 15 shows charts of free area management information and recording file management information described in relation to the second preferred embodiment of the present invention;

FIG. 16 shows charts of free area management information and recording file management information described in relation to the second preferred embodiment of the present invention;

FIG. 17 shows charts of free area management information and recording file management information described in relation to the second preferred embodiment of the present invention;

FIG. 20 shows charts of free area management information and recording file management information according to the conventional technique; and FIG. 21 shows charts of free area management information and recording file management information according to the conventional technique.

EXPLANATION OF THE REFERENCE SYMBOLS

| | |
|---|---|
| 10 | interface circuit |
| 20 | system controller |
| 21 | buffer control circuit |
| 22 | buffer RAM |
| 30 | recording/reproducing means |
| 31 | disk |
| 40 | encoder circuit |
| 41 | decoder circuit |
| 50 | recording area setting means |
| 60 | file management means |
| 61 | deletion file selecting criteria information setting means |
| 62 | data classification information setting means |
| 70 | display/manipulation means |
| 80 | digital AV equipment |
| 160 | file management means |
| 161 | deletion file selecting criteria information setting means |
| 162 | data classification information setting means |
| 170 | display/manipulation means |
| 180 | PC |
| 181 | STB |
| 260 | file management means |
| 261 | deletion file selecting criteria information setting means |

BEST MODE FOR IMPLEMENTING THE INVENTION

In the following, preferred embodiments of the present invention will be described.

First Preferred Embodiment

Figure 1:
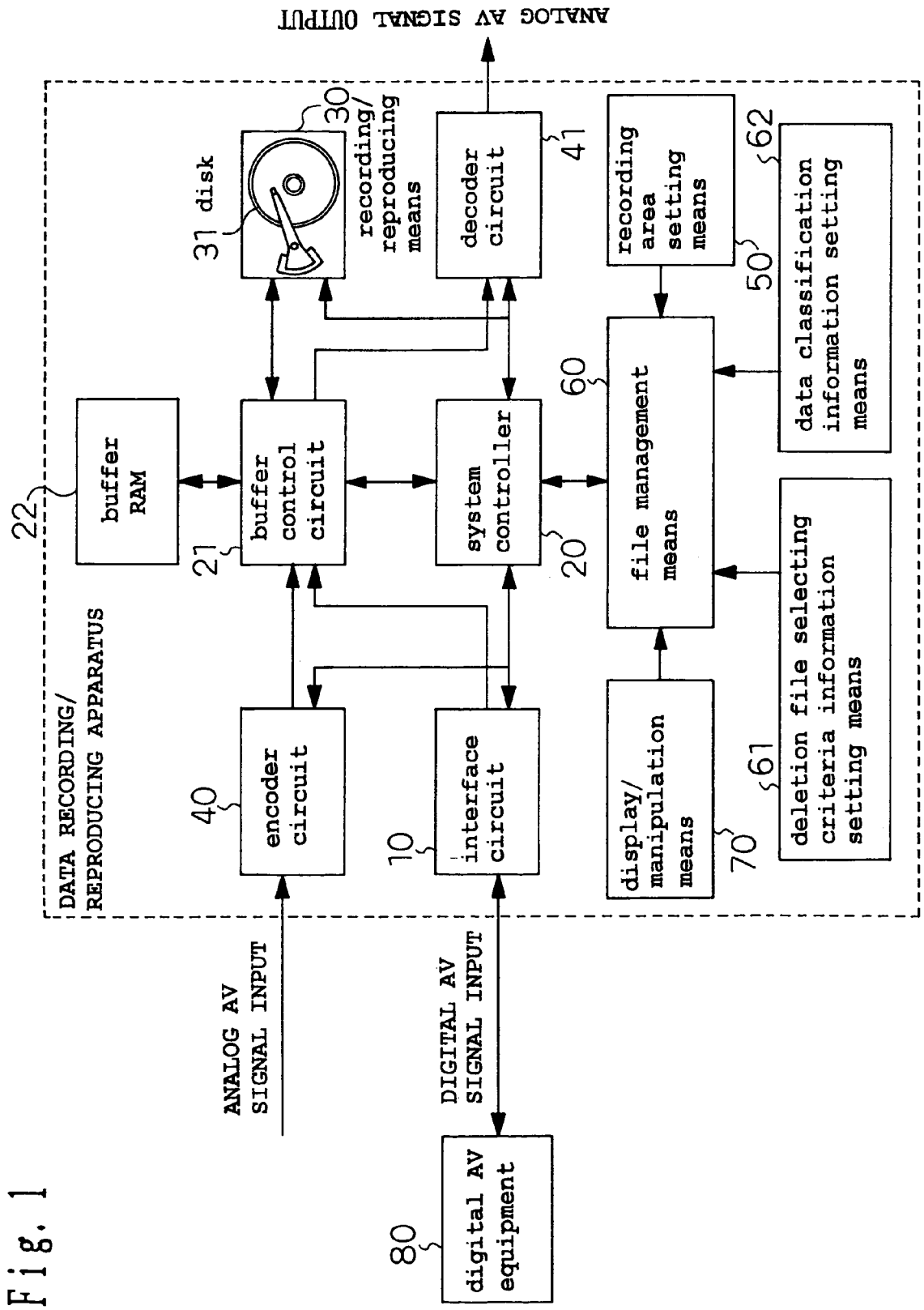
FIG. 1 is a structure diagram of a data recording/reproducing apparatus described in relation to a first preferred embodiment of the present invention.

First, a structure of a data recording/reproducing apparatus according to a first preferred embodiment will be described with reference to FIG. 1. FIG. 1 is a structure diagram of the data recording/reproducing apparatus according to the first preferred embodiment.

An interface circuit 10 comprises an input terminal for receiving a digital AV signal (not shown), serving as a portion which supplies digital AV signals, instructions and responses to and receives the digital AV signals, the instructions and the responses from digital AV equipment 80. In the first preferred embodiment, the digital AV equipment 80 and the interface circuit 10 are connected with an IEEE1394 bus.

A system controller 20 is a device which presides over and controls each means which forms the data recording/reproducing apparatus, controlling so that a digital AV signal which is supplied through the interface circuit 10 or an encoder circuit 40 is recorded on a disk 31 and such that the digital AV signal recorded on the disk 31 is outputted through the interface circuit 10 or a decoder circuit 41. Meanwhile, the system controller 20 controls such that the digital AV signal which is recorded on the disk 31 is saved and deleted in the unit of files.

A buffer control circuit 21 is a circuit which outputs the digital AV signal, which is supplied through the interface circuit 10 or the encoder circuit 40, to recording/reproducing means 30 after temporarily storing the digital AV signal in a buffer RAM 22, and outputs the digital AV signal to the interface circuit 10 or the decoder circuit 41 after temporarily storing the digital AV signal supplied from the recording/reproducing means 30 in the buffer RAM 22, to thereby ensure continues recording or continuous reproduction of the AV signal.

The buffer RAM 22 is a device which has a function as a register to read out temporarily saved data in accordance with a necessity.

The recording/reproducing means 30 is means of recording the digital AV signal received from the buffer control circuit 21 on the disk 31, and reproducing the digital AV signal recorded on the disk 31 and outputting to the buffer control circuit 21.

The encoder circuit 40 is a circuit which comprises an input terminal for receiving a digital AV signal (not shown) and encodes an inputted analog AV signal.

The decoder circuit 41 is a circuit which decodes the digital AV signal outputted by the recording/reproducing means 30 and supplies the analog AV signal to a reproducing apparatus (not shown) to thereby reproduce images and sounds.

Recording area setting means 50 is means which sets up a plurality of logical recording areas on the disk 31 whose capacity is 100 GB.

File management means 60 is means of referring to and updating free area management information, recording file management information, deletion file selecting criteria information and the like to thereby manage reproduction, saving, deletion, etc., of files, issuing an instruction to the system controller 20 so that an entered digital AV signal is recorded on the disk 31 in the unit of files and the digital AV signal recorded on the disk 31 is reproduced in the unit of files. Further, the file management means 60 issues an instruction to the system controller 20 so that the digital AV signal recorded on the disk 31 is deleted in the unit of files. The free area management information, the recording file management information, and the deletion file selecting criteria information according to the first preferred embodiment will be described later.

Deletion file selecting criteria information setting means 61 is means which is for a user to set up deletion file selecting criteria information which is for selecting a file which is to be deleted as new data are written (hereinafter referred to as a "delete candidate") for each recording area which is set up by the recording area setting means 50.

Data classification information setting means 62 is means which is for a user to set up data classification information which is for setting up a classification of data which are to be written for each recording area which is set up by the recording area setting means 50.

Display/manipulation means 70 is means which comprises a displaying portion, which displays to outside that it is impossible to write new data when the file management means 60 determines that it is impossible to write the new data, and a manipulation portion which accepts manipulations from outside in response to such a display.

The digital AV equipment 80 is equipment which supplies the digital AV signal, an instruction and a response to and receives the digital AV signal, the instruction and the response from the interface circuit 10 of the data recording/reproducing apparatus.

Operations of the data recording/reproducing apparatus according to the first preferred embodiment having such a structure will be described with reference to FIGS. 1 through 12. FIG. 2 shows charts of data classification information and deletion file selecting criteria information according to the first preferred embodiment, while FIG. 3 shows a chart of free area management information according to the first preferred embodiment.

In response to an instruction from a user, the recording area setting means 50 provides, through the file management means 60, the system controller 20 with an instruction for setting up three logical recording areas AID1, AID2 and AID3 on the disk 31.

Upon receipt of the instruction from the recording area setting means 50, the system controller 20 sets up the three logical recording areas AID1, AID2 and AID3 on the disk 31. In the first preferred embodiment, recording capacities of the recording areas AID1, AID2 and AID3 are 80 GB, 10 GB and 10 GB, respectively. The system controller 20 notifies the file management means 60 that the three logical recording areas AID1, AID2 and AID3 are set up on the disk 31.

The file management means 60 holds free area management information as that shown in FIG. 3 which contains a recording capacity, a recorded capacity and the capacity of a free area (hereinafter referred to as a "free capacity").

In response to an instruction from a user, the data classification information setting means 62 provides the file management means 60 with data classification information which is for setting up a classification of data which are to be written for each one of the recording areas AID1, AID2 and AID3. In short, the data classification information setting means 62 notifies the file management means 60 of setup which allows writing of video data in the recording area AID1. Meanwhile, the data classification information setting means 62 notifies the file management means 60 of setup which allows writing of audio data in the recording area AID2. Further, the data classification information setting means 62 notifies the file management means 60 of setup which allows writing of only still image data in the recording area AID3. The data classification information in the first preferred embodiment is as shown in FIG. 2.

In response to an instruction from a user, the deletion file selecting criteria information setting means 61 provides the file management means 60 with deletion file selecting criteria information which is for selecting a file which is to be deleted as new data are written, for each one of the recording areas AID1, AID2 and AID3. In other words, the deletion file selecting criteria information setting means 61 notifies the file management means 60 of setup which allows priority deletion, in the recording area AID1, of a file which bears the number of viewing of 1 or larger and the earliest recording start time. Meanwhile, the deletion file selecting criteria information setting means 61 notifies the file management means 60 of setup which allows priority deletion, in the recording area AID2, of a file which bears the earliest recording start time. Further, the deletion file selecting criteria information setting means 61 notifies the file management means 60 of setup which does not allow automatic deletion of a file by the file management means 60 at all in the recording area AID3. The deletion file selecting criteria information in the first preferred embodiment is as shown in FIG. 2.

Next, a description will be given on operations of the data recording/reproducing apparatus according to the first preferred embodiment as the digital AV equipment 80 receives data as a signal. The data are still image data to be saved in the recording area AID3 as a file FID1 whose size is 1 MB.

The digital AV equipment 80 outputs to the data recording/reproducing apparatus this data which are to be recorded and the volume of this data to be recorded, as a signal.

The system controller 20 analyzes the signal supplied from the digital AV equipment 80, and notifies the file management means 60 that this data are data which are to be saved as a 1 MB file.

The file management means 60 holds the data classification information as that shown in FIG. 2 which is for setting up a classification of data which are to be written for each one of the recording areas AID1, AID2 and AID3. Hence, the file management means 60 determines that it is necessary to write the data received as the signal through the digital AV equipment 80 in the recording area AID3 which is set to be written with still image data.

In addition, the file management means 60 holds the deletion file selecting criteria information as that shown in FIG. 3 which contains a recording capacity, a recorded capacity and a free capacity. Hence, the file management means 60 recognizes that the free capacity of the recording area AID3 is 10 GB which is larger than the size of the file (1 MB) which is to be saved.

The file management means 60 determines to save the data received as the signal through the digital AV equipment 80 as the file FID1 in the recording area AID3, and orders the system controller 20 to execute this.

Upon receipt of the instruction from the file management means 60, the system controller 20 writes the data supplied from the digital AV equipment 80 as the file FID1 in the recording area AID3, and notifies the file management means 60 of this.

Receiving the notification from the digital AV equipment 80 as a signal, the file management means 60 updates the free area management information shown in FIG. 3 into such free area management information as that shown in FIG. 4. Further, reflecting the new recording of the file FID1, the file management means 60 newly holds recording file management information which contains recording area information, the recording start time, a file size and the number of viewing regarding the file FID1 as those shown in FIG. 4. FIG. 4 shows charts of the free area management information and the recording file management information which are updated in the first preferred embodiment.

The system controller 20 in some cases outputs data saves as a file on the disk 31, through the decoder circuit 41, in response to an instruction from a user. The number of outputting is described as the number of viewing in the recording file management information.

The data recording/reproducing apparatus according to the first preferred embodiment writes data in accordance with setup specified by the data classification information, in a manner described above. An operation for writing is similar to the writing operation already described earlier, when a free capacity in a predetermined recording area is larger than the size of data which are to be newly written.

The data recording/reproducing apparatus according to the first preferred embodiment in this manner keeps writing data on the disk 31 which is loaded in the recording/reproducing means 30, so that files FID5, FID8 and FID9 are saved in the recording area AID1. Meanwhile, files FID4, FID6, FID7, . . . , FID998 are saved in the recording area AID2. In the recording area AID3, files FID1, FID2, FID3, . . . , FID999 are saved.

Figure 5:
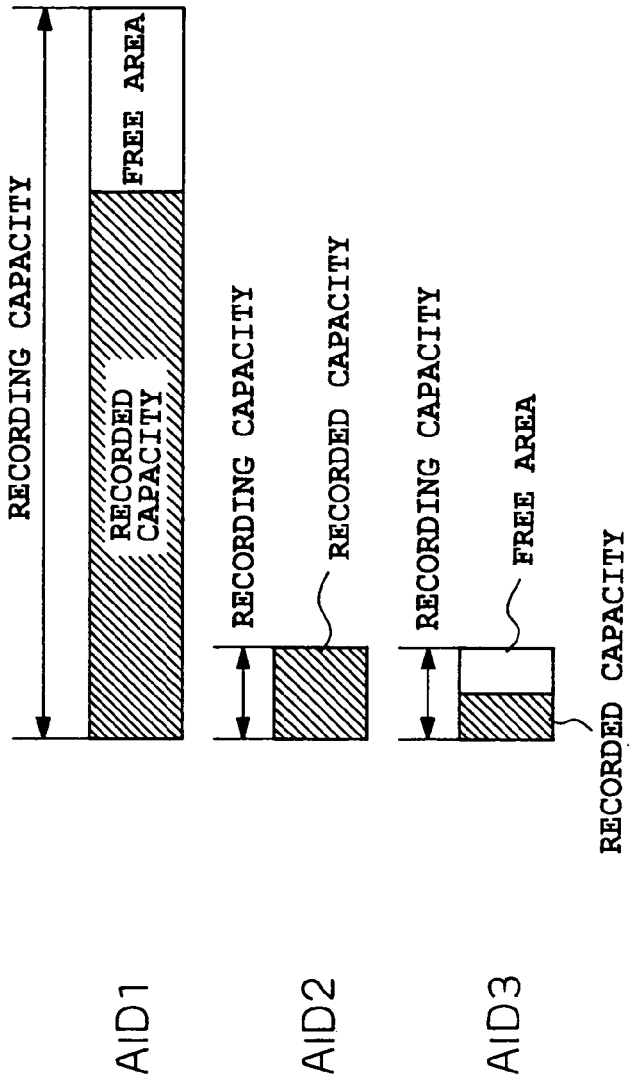
FIG. 5 shows a chart and a diagram showing free area management information described in relation to the first preferred embodiment of the present invention.

As a result of this, the free area management information held by the file management means 60 is updated, whereby the file management means 60 holds such free area management information as that shown in FIG. 5 which contains the recording capacities, recorded capacities and free capacities of the recording areas AID1, AID2 and AID3. FIG. 5 shows a chart and a diagram showing the free area management information which is updated in the first preferred embodiment. For instance, the recording capacity, the recorded capacity and the free capacity of the recording area AID1 are 80 GB, 60 GB and 20 GB, respectively.

In addition, the recording file management information held by the file management means 60 is updated, whereby the file management means 60 holds such recording file management information as that shown in FIG. 6 which contains recording area information, the recording start time, the file sizes and the number of viewing regarding these files. FIG. 6 shows charts of the recording file management information which is updated in the first preferred embodiment. For instance, the recording area information, the recording start time, the file size and the number of viewing regarding the file FID5 are L1, 2000/10/02/17:00 (that is, 17:00, the 2nd of Oct., the year 2000), 10 GB and zero, respectively.

Next, a description will be given on operations of the data recording/reproducing apparatus according to the first preferred embodiment as the digital AV equipment 80 receives new data further as a signal so that a free capacity becomes insufficient and a file needs be therefore deleted. The new data referred to here are video data which are to be saved in the recording area AID1 as a file FID1000 whose size is 30 GB.

The digital AV equipment 80 outputs to the data recording/reproducing apparatus this new data which are to be recorded and the volume of this data to be recorded, as a signal.

The system controller 20 analyzes the signal supplied from the digital AV equipment 80, and notifies the file management means 60 that this new data are video data which are to be saved as a 30 GB file.

Referring to the data classification information as that shown in FIG. 2, the file management means 60 determines that it is necessary to record the video data signal from the digital AV equipment 80 in the recording area AID1 which is set as a video data recording area.

Further, referring to the free area management information as that shown in FIG. 5, the file management means 60 recognizes that the free capacity of the recording area AID1 is 20 GB which is smaller than the size of the file (30 GB) which is to be saved.

The file management means 60 holds the deletion file selecting criteria information as that shown in FIG. 2 which is for selecting a file which is to be deleted as new data are written, for each one of the recording areas AID1, AID2 and AID3. The file management means 60 recognizes that the file FID8 which bears the number of viewing of 1 or larger and the earliest recording time is a delete candidate, judges that it is necessary to delete the file FID8 in order to write the data newly supplied as the signal from the digital AV equipment 80 in the recording area AID1.

The file management means 60 determines to delete the file FID8 and ensure a free area of 40 GB in total so that the data received as the signal through the digital AV equipment 80 will be written in the recording area AID1 as the file FID1000. The file management means 60 then demands the system controller 20 to execute this.

Receiving the instruction outputted as a signal from the file management means 60, the system controller 20 deletes the file FID8 and writes the data received through the digital AV equipment 80 in the recording area AID1 as the file FID1000. The system controller 20 notifies the file management means 60 of this.

Upon receipt of the notification from the system controller 20, the file management means 60 updates the free area management information shown in FIG. 5 into such free area management information as that shown in FIG. 7. FIG. 7 shows a chart of the free area management information which is updated in the first preferred embodiment. As shown in FIG. 7, a free capacity in the recording area AID1 is 10 GB.

In addition, the file management means 60 updates the recording file management information shown in FIG. 6 into such recording file management information as that shown in FIG. 8. FIG. 8 shows charts of the recording file management information which is updated in the first preferred embodiment. The recording area information, the recording start time, the file size and the number of viewing regarding the file FID1000 are L1000, 2003/11/07/12:00, 30 GB and zero, respectively.

Next, a description will be given on operations of the data recording/reproducing apparatus according to the first preferred embodiment as new data are supplied from the digital AV equipment 80 further as a signal and a plurality of files are selected and deleted. The new data referred to here are audio data which are to be saved in the recording area AID2 as a file FID1001 whose size is 9 MB.

The digital AV equipment 80 outputs to the data recording/reproducing apparatus this new data which are to be recorded and the volume of this data to be recorded, as a signal.

The system controller 20 analyzes the signal supplied from the digital AV equipment 80, and notifies the file management means 60 that this new data are audio data which are to be saved as a 9 MB file.

Referring to the data classification information as that shown in FIG. 2, the file management means 60 determines that it is necessary to record the audio data signal received from the digital AV equipment 80 in the recording area AID2 which is set as a audio data recording area.

Further, referring to the free area management information as that shown in FIG. 7, the file management means 60 recognizes that the free capacity in the recording area AID2 is 0 GB which is smaller than the size of the file (9 MB) which is to be saved.

The file management means 60 holds the deletion file selecting criteria information as that shown in FIG. 2. The file management means 60 recognizes that the file FID4 which bears the earliest recording start time is a delete candidate and the file FID6 which bears the second earliest recording start time is a second delete candidate. The file management means 60 judges that it is necessary to delete these in order to write the data newly supplied as the signal from the digital AV equipment 80 in the recording area AID2.

The file management means 60 determines to delete the files FID4 and FID6 and ensure a free area of 9 MB in total so that the data supplied as the signal from the digital AV equipment 80 will be written in the recording area AID2 as the file FID1001. The file management means 60 then demands the system controller 20 to execute this.

Receiving the instruction outputted as a signal from the file management means 60, the system controller 20 deletes the files FID4 and FID6 and writes the data supplied from the digital AV equipment 80 in the recording area AID2 as the file FID1001. The system controller 20 notifies the file management means 60 of this.

Upon receipt of the notification from the system controller 20, the file management means 60 updates the free area management information shown in FIG. 7 into such free area management information as that shown in FIG. 9. FIG. 9 shows a chart of the free area management information which is updated in the first preferred embodiment. As shown in FIG. 9, a free capacity in the recording area AID2 becomes 0 GB. In addition, the file management means 60 updates the recording file management information shown in FIG. 8 into such recording file management information shown as that shown in FIG. 10. FIG. 10 shows a chart of the recording file management information shown which is updated in the first preferred embodiment.

Next, a description will be given on operations of the data recording/reproducing apparatus according to the first preferred embodiment as new data are supplied from the digital AV equipment 80 further as a signal but the file management means 60 is not allowed automatic deletion. The new data referred to here are video data which are to be saved in the recording area AID1 as a file FID1002 whose size is 30 GB.

The digital AV equipment 80 outputs to the data recording/reproducing apparatus this new data which are to be recorded and the volume of this data to be recorded, as a signal. The system controller 20 analyzes the signal supplied from the digital AV equipment 80, and notifies the file management means 60 that this new data are video data which are to be saved as a 30 GB file.

The file management means 60 determines that it is necessary to record in the recording area AID1 which is set as a video data recording area, since the signal received from the digital AV equipment 80 represents video data. Further, referring to the free area management information which is shown also in FIG. 9, the file management means 60 recognizes that a free capacity in the recording area AID1 is 10 GB which is smaller than the size of the file (30 GB) which is to be newly saved.

The file management means 60 holds the deletion file selecting criteria information as that shown in FIG. 2. However, since the number of viewing of the files FID5, FID9 and FID1000 saved in the recording area AID1 is equally zero, the file management means 60 can not recognize a file which bears the number of viewing of 1 or larger and the earliest recording start time as a delete candidate.

The file management means 60 causes the display/manipulation means 70 to display, in the displaying portion, that it is not possible to recognize a delete candidate.

As a user designates the file FID5 as a delete candidate based on the displayed information, the manipulation portion of the display/manipulation means 70 provides the file management means 60 with an instruction designating the file FID9 as a delete candidate, in the form of a signal.

The file management means 60 receives the instruction received through the display/manipulation means 70 which designates the file FID5 as a delete candidate.

However, the sum of the size of the file FID5 designated as a delete candidate and the free capacity (10 GB) of the recording area AID1 is 20 GB which is smaller than the size of the file (30 GB) which is to be newly saved.

Referring to the deletion file selecting criteria information which is shown also in FIG. 2, the file management means 60 tries to recognize a file which bears the number of viewing of 1 or larger and the earliest recording start time as a delete candidate, other than the file FID5 which is designated as a delete candidate.

However, the number of viewing of the files FID9 and FID1000 saved in the recording area AID1 other than the file FID5 which is designated as a delete candidate is both zero.

The file management means 60 causes the display/manipulation means 70 to display, in the displaying portion, that it is not possible to recognize a second delete candidate.

As a user designates the file FID9 as a second delete candidate based on the displayed information, the manipulation portion of the display/manipulation means 70 provides the file management means 60 with an instruction designating the file FID9 as a second delete candidate, in the form of a signal.

The file management means 60 receives the instruction received through the display/manipulation means 70 which designates the file FID9 as a second delete candidate.

The file management means 60 determines to delete the files FID5 and FID9 and ensure a free area of 50 GB in total so that the data fed as the signal from the digital AV equipment 80 will be written in the recording area AID1 as the file FID1002. The file management means 60 then demands the system controller 20 to execute this.

Receiving the instruction outputted as a signal from the file management means 60, the system controller 20 deletes the files FID5 and FID9 and writes the data inputted through the digital AV equipment 80 in the recording area AID1 as the file FID1002. The system controller 20 notifies the file management means 60 of this.

Upon receipt of the notification from the system controller 20, the file management means 60 updates the free area management information shown in FIG. 9 into such free area management information as that shown in FIG. 11. FIG. 11 shows a chart of the free area management information which is updated in the first preferred embodiment. In addition, the file management means 60 updates the recording file management information shown in FIG. 10 into such recording file management information shown as that shown in FIG. 12. FIG. 12 shows a chart of the recording file management information shown which is updated in the first preferred embodiment.

In this manner, it is possible to execute management, such as saving and deletion of files, appropriately by data type.

Second Preferred Embodiment

Figure 13:
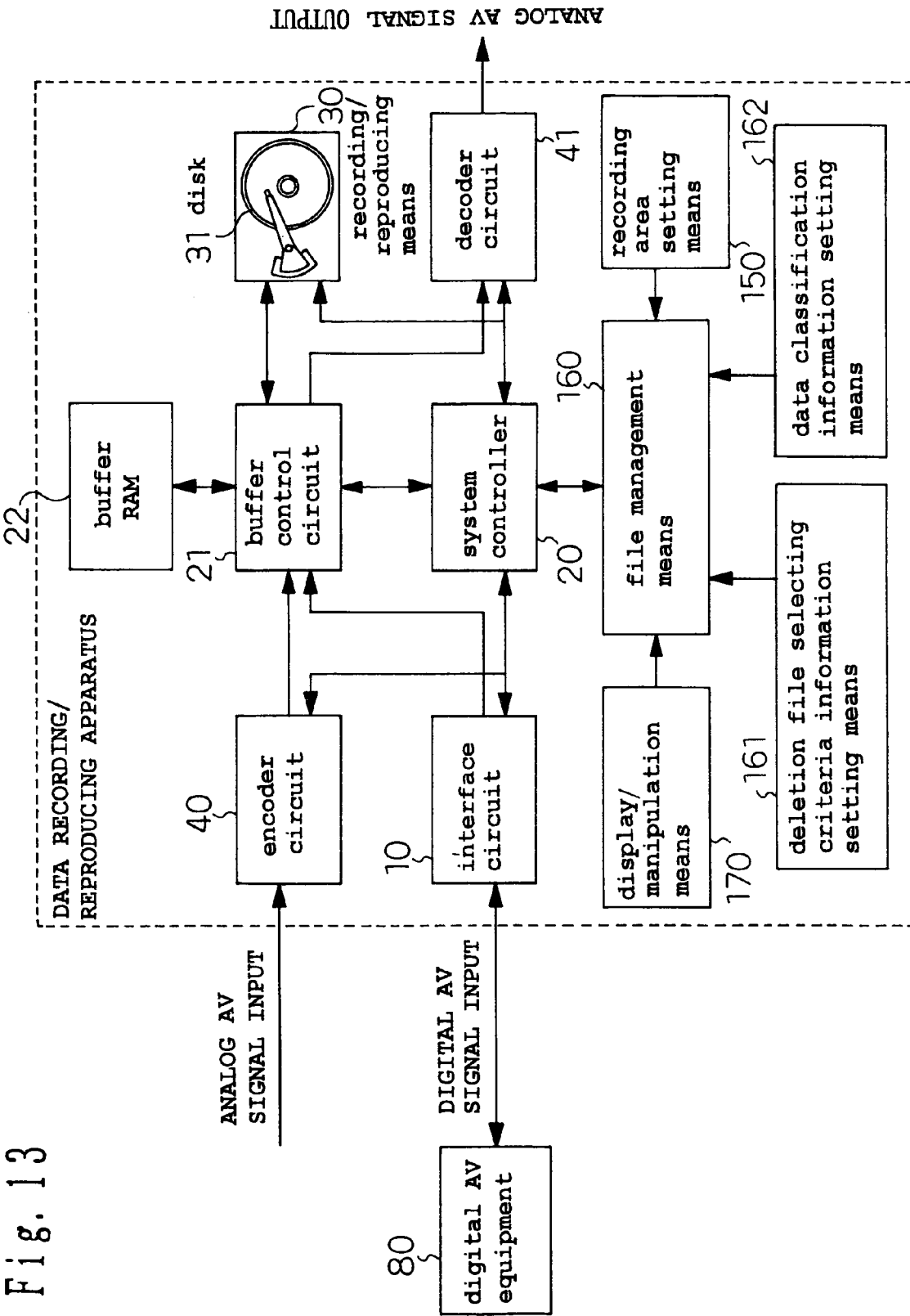
FIG. 13 is a diagram of a data recording/reproducing apparatus described in relation to a second preferred embodiment of the present invention.

First, a structure of a data recording/reproducing apparatus according to a second preferred embodiment will be described with reference to FIG. 13. FIG. 13 is a structure diagram of the data recording/reproducing apparatus according to the second preferred embodiment.

File management means 160 is means of referring to free area management information, recording file management information, deletion file selecting criteria information and the like to thereby manage saving, deletion, etc., of files.

Deletion file selecting criteria information setting means 161 is means which is for a user to set up deletion file selecting criteria information which is for selecting a delete candidate in each recording area which is set up by the recording area setting means 150.

Data classification information setting means 162 is means which is for a user to set up a classification of data which are to be written for each recording area which is set up by the recording area setting means 150.

Display/manipulation means 170 is means which comprises a displaying portion, which displays to outside that it is impossible to write new data when the file management means 60 can not write the new data, and a manipulation portion which accepts manipulations from outside in response to such a display.

Operations of the data recording/reproducing apparatus according to the second preferred embodiment having such a structure will be described with reference to FIGS. 13 through 17. FIG. 14 shows charts of data classification information and deletion file selecting criteria information according to the second preferred embodiment.

In response to an instruction from a user, the recording area setting means 150 provides the recording/reproducing means 30 with an instruction for setting up two logical recording areas AID1, AID2 on the disk 31. The recording/reproducing means 30, receiving the instruction from the recording area setting means 150, sets up the two logical recording areas AID1, AID2 on the disk 31. The recording capacities of the recording areas AID1 and AID2 are 20 GB and 80 GB, respectively. The recording/reproducing means 30 notifies the file management means 160 that the two logical recording areas AID1, AID2 are set up on the disk 31.

In response to an instruction from a user, the data classification information setting means 162 provides the file management means 160 with the data classification information which is for setting up a classification of data which are to be written for each one of the recording areas AID1 and AID2. The data classification information in the second preferred embodiment contains detailed setup for further classifying and grouping files (hereinafter sometimes referred to as the "detailed data classification") in the recording areas AID1 and AID2.

That is, the data classification information setting means 162 notifies the file management means 160 of such setup which causes writing of only audio data in the recording area AID1 and grouping of files to be saved in the recording area AID1 having the same recording date. The data classification information setting means 162 also notifies the file management means 160 of such setup which causes writing of only video data in the recording area AID2 and grouping of files to be saved in the recording area AID2 having the same number of viewing.

In response to an instruction from a user, the deletion file selecting criteria information setting means 161 provides the file management means 160 with the deletion file selecting criteria information which is for selecting a file which is to be deleted as new data are written for each one of the recording areas AID1 and AID2. The deletion file selecting criteria information in the second preferred embodiment contains detailed setup for deleting a plurality of files all at once in each one of the recording areas AID1 and AID2.

In short, the deletion file selecting criteria information setting means 161 notifies the file management means 160 of such setup which causes en-masse deletion, in the recording area AID 1, of files which belongs to the same group as a file whose recording time is earliest. Further, the deletion file selecting criteria information setting means 161 notifies the file management means 160 of such setup which causes en-masse deletion, in the recording area AID2, of files which belongs to the same group as a file which bears the largest number of viewing.

The data recording/reproducing apparatus according to the second preferred embodiment writes data in accordance with setup designated by the data classification information, when a free capacity in a predetermined recording area is larger than the size of data which are to be newly written. An operation for writing is similar to the writing operation already described in the section "(First Preferred Embodiment)" in detail above.

The data recording/reproducing apparatus according to the second preferred embodiment in this manner keeps writing data on the disk 31 which is loaded in the recording/reproducing means 30, so that files FID1, FID2, . . . , FID999 are saved in the recording area AID1. Meanwhile, the files FID6, FID7, . . . , FID998 are saved in the recording area AID2.

The file management means 160 holds the free area management information and the recording file management information. The free area management information contains a recording capacity, a recorded capacity and a free capacity, while the recording file management information contains recording area information, the recording start time, a file size, the number of viewing and a detailed data classification, both of which are as shown in FIG. 15. FIG. 15 shows charts of the free area management information and the recording file management information updated in the second preferred embodiment. For instance, in the recording area AID1, the files FID1, FID2 and FID3 having the same recording date (which is 2000/01/02) belong to a group GID1.

Next, a description will be given on operations of the data recording/reproducing apparatus according to the second preferred embodiment as new data are supplied from the digital AV equipment 80 further as a signal. The new data referred to here are audio data which are to be saved in the recording area AID1 as a file FID1000 whose size is 13 MB.

The digital AV equipment 80 outputs to the data recording/reproducing apparatus this data which are to be recorded and the volume of this data to be recorded, as a signal. The system controller 20 analyzes the signal supplied from the digital AV equipment 80, and notifies the file management means 160 that this data are audio data which are to be saved as a 13 MB file.

Referring to the data classification information as shown in FIG. 14, the file management means 160 determines that it is necessary to record the audio data signal received from the digital AV equipment 80 in the recording area AID1 which is set as a audio data recording area.

Further, referring to the free area management information as that shown in FIG. 15, the file management means 160 recognizes that a free capacity in the recording area AID1 is 0 GB which is smaller than the size of the file (13 MB) which is to be newly saved.

As shown in FIG. 15, files in the recording area AID1 having the same recording date as the file FID1 whose recording time is earliest are grouped as the group GID1 in accordance with the setup designated by the data classification information which is shown in FIG. 14.

Referring to the deletion file selecting criteria information shown in FIG. 14, the file management means 160 recognizes that the files FID1, FID2 and FID3 belonging to the group GID1 are delete candidates.

The file management means 160 determines to delete the files FID1, FID2 and FID3 and ensure a free area of 13 MB in total so that the data received as the signal through the digital AV equipment 80 will be written in the recording area AID1 as the file FID1000. The file management means 160 demands the system controller 20 to execute this.

Receiving the instruction outputted as a signal from the file management means 160, the system controller 20 deletes the files FID1, FID2 and FID3 and writes the data supplied from the digital AV equipment 80 in the recording area AID1 as the file FID1000. The system controller 20 notifies the file management means 160 of this.

Upon receipt of the notification from the system controller 20, the file management means 160 updates the free area management information and the recording file management information shown in FIG. 15 into such free area management information and such recording file management information as those shown in FIG. 16. FIG. 16 shows charts of the free area management information and the recording file management information updated in the second preferred embodiment.

Next, a description will be given on operations of the data recording/reproducing apparatus according to the second preferred embodiment as the digital AV equipment 80 receives new data as a signal. The new data referred to here are video data to be saved in the recording area AID2 as a file FID 1001 whose size is 5 GB.

The system controller 20 analyzes the signal supplied from the digital AV equipment 80, and notifies the file management means 160 that this new data are video data which are to be saved as a 5 GB file.

Referring to the data classification information as shown in FIG. 14, the file management means 160 determines that it is necessary to record the signal supplied from the digital AV equipment 80 in the recording area AID2.

Further, referring to the free area management information as that shown in FIG. 16, the file management means 160 recognizes that a free capacity in the recording area AID2 is 2 GB which is smaller than the size of the file (5 GB) which is to be newly saved.

As shown in FIG. 16, files in the recording area AID2 having the largest number of viewing are grouped as a group GID3 in accordance with the setup designated by the data classification information which is shown in FIG. 14. Since the files having the same number of viewing are grouped in this manner, a dialogue with a user as described in the section "(First Preferred Embodiment)" is not necessary in the following operations.

Referring to the deletion file selecting criteria information shown in FIG. 14, the file management means 160 recognizes that the files FID6 and FID7 belonging to the group GID3 are delete candidates.

The file management means 160 determines to delete the files FID6 and FID7 and ensure a free area of 6 GB in total so that the data received as the signal through the digital AV equipment 80 will be written in the recording area AID2 as the file FID 1001. The file management means 160 demands the system controller 20 to execute this.

Receiving the instruction outputted as a signal from the file management means 160, the system controller 20 deletes the files FID6 and FID7 and writes the data supplied through the digital AV equipment 80 in the recording area AID2 as the file FID1001. The system controller 20 notifies the file management means 160 of this. Upon receipt of the notification from the system controller 20, the file management means 160 updates the free area management information and the recording file management information shown in FIG. 16 into such free area management information and such recording file management information as those shown in FIG. 17. FIG. 17 shows charts of the free area management information and the recording file management information updated in the second preferred embodiment.

As the plurality of unnecessary files are deleted appropriately at once in this manner, it is possible to ensure a large free area without fail.

The disk 31 in the present invention needs not be set up with logical recording areas in a manner as described above in relation to the preferred embodiments, but may be set up with any desired number of logical recording areas each having any desired recording capacity.

Further, the input terminal for receiving an analog AV signal (not shown) of the encoder circuit 40 according to the present invention may be connected with a signal input apparatus which can receive an analog AV signal.

Figure 18:
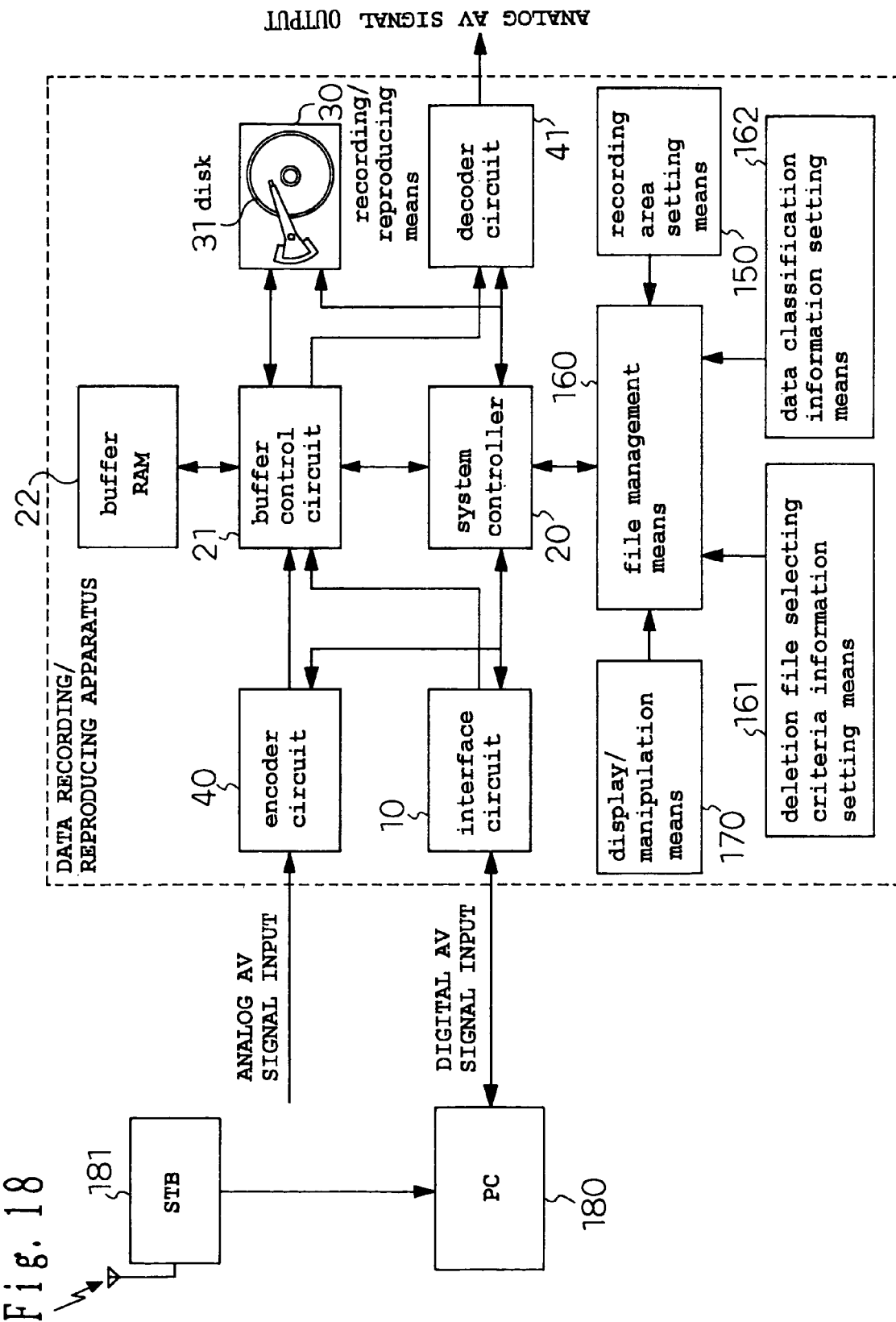
FIG. 18 is a diagram of a data recording/reproducing apparatus and peripheral equipment described in relation to the preferred embodiments of the present invention.
Figure 19:
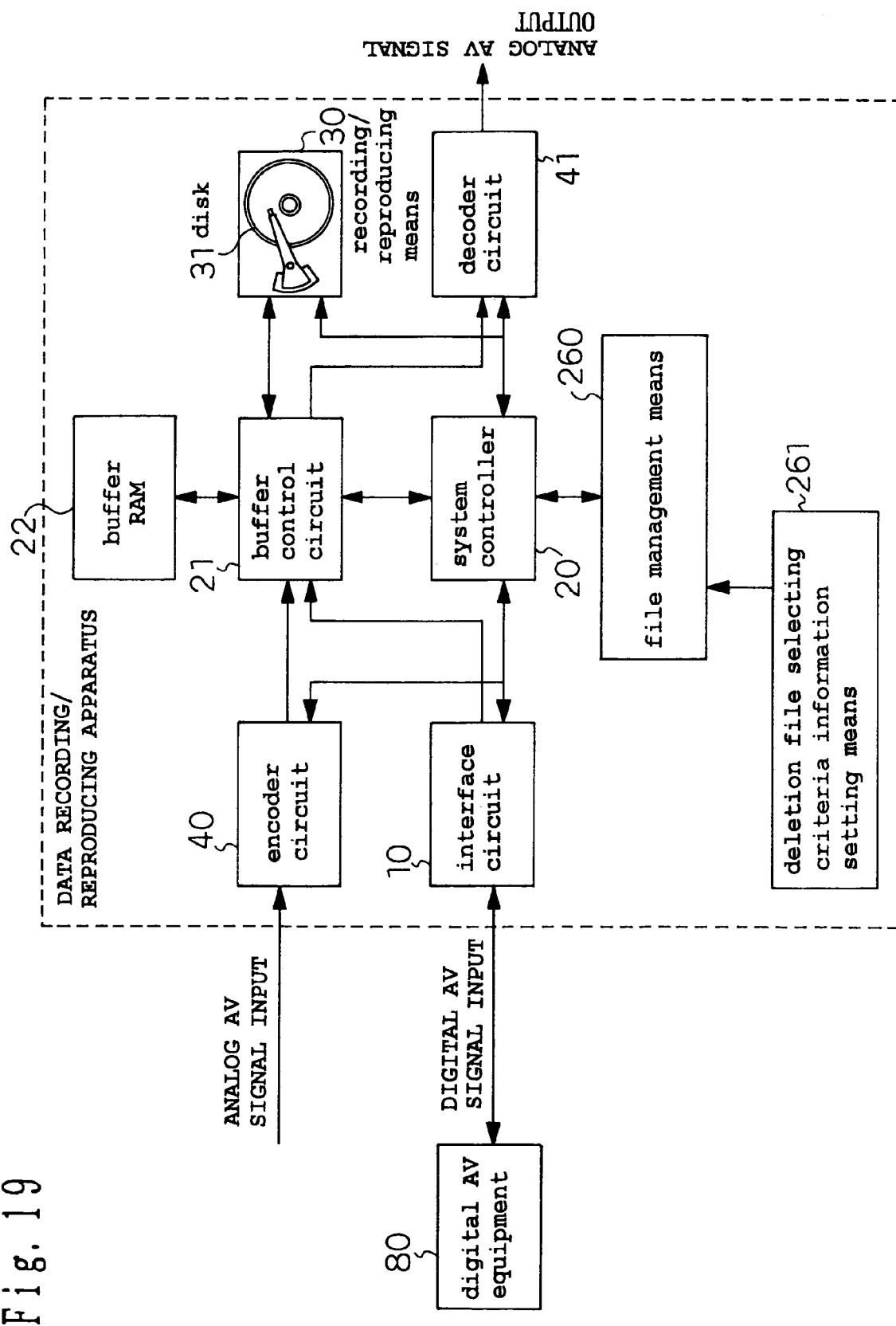
FIG. 19 is a diagram of a data recording/reproducing apparatus according to a conventional technique.

Still further as shown in FIG. 18, the interface circuit 10 may be connected with a PC (Personal Computer) 180 which is connected with an STB (Set Top Box, satellite broadcasting receiver) 181 via an IEEE1394 bus. FIG. 18 is a diagram of a data recording/reproducing apparatus and peripheral equipment described in relation to the preferred embodiments of the present invention.

In addition, the data classification information in the present invention needs not be set up utilizing the dedicated data classification information setting means as in the preferred embodiments above. Information which is set by means of manipulations on a key board of the PC 180 (as that shown in FIG. 18) may be received as a command parameter from the PC 180 and set as the data classification information.

Moreover, the deletion file selecting criteria information in the present invention needs not be set up utilizing the dedicated deletion file selecting criteria information setting means as in the preferred embodiments above. Information which is set by means of manipulations on a key board of the PC 180 (as that shown in FIG. 18) may be received as a command parameter from the PC 180 and set as the deletion file selecting criteria information.

Although the volume of data to be recorded is inputted together with the data to be recorded in the data recording/reproducing apparatus according to the present invention, the volume of the data to be recorded may not be inputted. In a case that the volume of the data to be recorded is not entered, the data recording/reproducing apparatus according to the present invention records data coming from the digital AV equipment 80 progressively as files on the disk 31. The file management means 60 checks a free capacity in a demanded recording area, and when the free capacity becomes smaller than a predetermined value, the file management means 60 selects and deletes a file so as to ensure a free capacity which is equal to or larger than the predetermined value.

Further, the data classification in the data classification information in the present invention need not be video data, audio data and still image data as in the preferred embodiments above, but may be any concepts which are dependent upon the contents of data, for instance, as far as the concepts realize a classification of data.

Further, the detailed data classification in the data classification information in the present invention need not be the recording date and the number of viewing as in the preferred embodiments above, but may be any concepts which are dependent upon the contents of data, for instance, as far as the concepts realize a classification of data.

Further, the deletion file selecting criteria in the deletion file selecting criteria information in the present invention need not be the number of viewing, the recording time and prohibition or a combination of these with the detailed data classification as in the preferred embodiments above, but may be any concepts which are dependent upon the contents of data or a combination of this with the detailed data classification, for instance, as far as the concepts provide the deletion file selecting criteria.

Further, the detailed data classification information and the deletion file selecting criteria information in the present invention need not remain unchanged after setup as in the preferred embodiments above, but may be changed freely any time.

The present invention also covers a medium which is characterized in that it can be processed with a computer and carries a program and/or data for executing with a computer all or some functions of all or some means of the data recording/reproducing apparatus according to the present invention.

The present invention further covers an aggregation of information which is characterized in being a program and/or data for executing with a computer all or some functions of all or some means of the data recording/reproducing apparatus according to the present invention.

The present invention is directed to a medium which carries a program and/or data for executing with a computer all or some functions of all or some means of the data recording/reproducing apparatus according to the present invention described above, and the medium can be read with a computer and causes the program and/or data which is read to execute the functions while working together with the computer.

The present invention is directed also to an aggregation of information which is program and/or data for executing with a computer all or some functions of all or some means of the data recording/reproducing apparatus according to the present invention described above, and the aggregation of information can be read with a computer and causes the program and/or data which is read to execute the functions while working together with the computer.

Data as referred to in the present invention include a data structure, a data format, a data type, etc.

A medium as referred to in the present invention can be a recording medium such as a ROM, a transmission medium such as the Internet, and a transmission medium such as light, an electric wave and a sonic wave.

A medium which carries as referred to in the present invention can be a recording medium in which a program and/or data is recorded, a transmission medium which transmits a program and/or data, and the like.

To be able to be processed with a computer as referred to in the present invention includes, in the case of a recording medium such as a ROM, for instance, that it is possible to read with a computer, and in the case of a transmission medium, that a program and/or data which is to be transmitted can be handled with a computer.

An aggregation of information as referred to in the present invention includes software, for instance, such as a program and/or data.

Further, as described above, the structures according to the present invention may be realized by means of software or hardware.

INDUSTRIAL USE

As clear from the foregoing, the first invention corresponding to claim 1 provides a data recording/reproducing apparatus which is characterized in executing appropriate management, such as saving and deletion of files, in accordance with a data type.

The second invention corresponding to claim 2 provides a data recording/reproducing apparatus which is characterized in more appropriately saving and deleting a file, in addition to the effect above.

The third invention corresponding to claim 3 provides a data recording/reproducing apparatus which is characterized in more appropriately selecting and deleting an unnecessary file, in addition to the effects above.

The fourth invention corresponding to claim 4 provides a data recording/reproducing apparatus which is characterized in ensuring a free area without fail, in addition to the effects above.

The fifth invention corresponding to claim 5 provides a data recording/reproducing apparatus which is characterized in classifying files in details, in addition to the effects above.

The sixth invention corresponding to claim 6 provides a medium which is characterized in executing appropriate management, such as saving and deletion of files, in accordance with a data type, and management of data which are to be transmitted.

The seventh invention corresponding to claim 7 provides an aggregation of information which is characterized in obtaining the effects above by means of execution with a computer.

The invention claimed is:

1. A data recording/reproducing apparatus, comprising:
    recording area setting means of setting a plurality of logical recording areas in a recording medium which is for recording and reproducing data; and
    file management means which refers to free area management information, which is for managing a free area capacity for each one of said recording areas, recording file management information, which is for managing a file to be recorded for each one of said recording areas, and deletion file selecting criteria information, which is for selecting a file to be deleted for each one of said recording areas, and executes management of said files,
    wherein for writing of new data in a predetermined recording area, when said file management means judges that a free area for writing said new data is insufficient with reference to said free area management information, said file management means, referring to said deletion file selecting criteria information, deletes a portion or all of at least one file which is recorded in said predetermined recording area or does not execute an operation for writing said new data,
    said deletion file selecting criteria information includes a deletion criteria based on a number of times a data file has been viewed,
    said file management means includes setting the number of times each of the stored data files has been viewed, and
    said file management means deletes the at least one file, if (i) a predetermined storage capacity available for the free area is smaller than an amount of data required to store said new data and (ii) the deletion criteria is satisfied which is based on the number of times a data file has been viewed, and the number of times the data file has been viewed is greater than one.

2. A data recording/reproducing apparatus in accordance with claim 1,
    wherein when not executing writing of said new data, said file management means notifies to outside that writing of said new data is not executed, and accepts an instruction in response to the notification from outside.

3. A data recording/reproducing apparatus in accordance with claim 1,
    including deletion file selecting criteria information setting means which is for a user to set up said deletion file selecting criteria information for each one of said recording areas.

4. A data recording/reproducing apparatus in accordance with claim 1,
    wherein said files are grouped in accordance with a predetermined criteria, said file management means, when deleting a portion or all of at least one file which is recorded in said predetermined recording area, deletes the file which is to be deleted as well as other files which belong to the same group as the file which is to be deleted.

5. A data recording/reproducing apparatus in accordance with any one of claim 1 through claim 4,
    wherein a classification of said data which are to be written is different for each one of said recording areas, and said data recording/reproducing apparatus comprises data classification information setting means which is for a user to set up, for each one of said recording areas, data classification information which is for setting up a classification of data which are to be written.

6. A medium which is handled with a computer and carries a program which is for executing, with a computer, functions of a data recording/reproducing apparatus in accordance with any one of claim 1 through claim 4.

7. A program for executing, with a computer, functions of a data recording/reproducing apparatus in accordance with any one of claim 1 through claim 4.

8. In a data recording/reproducing apparatus, a method of managing data in a recording medium for recording and reproducing data, comprising the steps of:
    (a) partitioning the recording medium into a plurality of recording areas, each having a predetermined storage capacity, in which each area defines a predetermined type of data;
    (b) assigning a deletion criteria for each of the respective areas defined in step (a), the deletion criteria including a number of times a data file has been viewed;
    (c) storing at least one data file of a predetermined type of data in a respective one of the areas defined in step (a), and setting the number of times each of the stored data files has been viewed;
    (d) determining storage capacity available for the defined area storing the at least one data file stored in step (c);
    (e) providing another data file of the predetermined type of data for storage in the defined area storing the at least one data file stored in step (c); and
    (f) deleting a stored data file stored in step (c), if (i) the predetermined storage capacity available for the one area is smaller than an amount of data required to store the other data file and (ii) the deletion criteria satisfies the deletion criteria assigned in step (b)
    wherein step (c) includes viewing the stored data files, and
    step (f) includes determining the stored data file has been viewed more times than the other stored data files and viewed in excess of one time, and
    deleting the stored data file determined to have been viewed more times than the other stored data files, wherein the stored data file has been viewed in excess of one time.

* * * * *